(12) United States Patent
Messina et al.

(10) Patent No.: US 7,778,483 B2
(45) Date of Patent: Aug. 17, 2010

(54) DIGITAL IMAGE PROCESSING METHOD HAVING AN EXPOSURE CORRECTION BASED ON RECOGNITION OF AREAS CORRESPONDING TO THE SKIN OF THE PHOTOGRAPHED SUBJECT

(75) Inventors: Giuseppe Messina, Giardini Naxos (IT); Sebastiano Battiato, Acicatena (IT); Alfio Castorina, Linera (IT); Laurent Plaza, Aix en Provence (FR)

(73) Assignees: STMicroelectronics S.r.l., Agrate Brianza (IT); STMicroelectronics SA, Montrouge (FR)

( * ) Notice: Subject to any disclaimer, the term of this patent is extended or adjusted under 35 U.S.C. 154(b) by 358 days.

(21) Appl. No.: 11/949,709

(22) Filed: Dec. 3, 2007

(65) Prior Publication Data

US 2008/0089583 A1    Apr. 17, 2008

Related U.S. Application Data

(62) Division of application No. 10/848,815, filed on May 18, 2004, now abandoned.

(30) Foreign Application Priority Data

May 19, 2003   (EP)   ................................. 03291155

(51) Int. Cl.
    *G06K 9/40*   (2006.01)
(52) U.S. Cl. ..................... 382/274; 382/118; 348/254; 348/652
(58) Field of Classification Search .............. 382/274
    See application file for complete search history.

(56) References Cited

U.S. PATENT DOCUMENTS

| | | | |
|---|---|---|---|
| 4,203,671 A | * | 5/1980 | Takahashi et al. ........... 356/402 |
| 5,130,935 A | * | 7/1992 | Takiguchi ................... 382/167 |
| 5,528,339 A | * | 6/1996 | Buhr et al. .................... 355/32 |
| 5,585,860 A | * | 12/1996 | Takeshima .................. 348/652 |
| 5,781,276 A | * | 7/1998 | Zahn et al. .................... 355/41 |
| 5,940,530 A | * | 8/1999 | Fukushima et al. ......... 382/164 |

(Continued)

FOREIGN PATENT DOCUMENTS

EP     0 502 369 B1    9/1992

(Continued)

OTHER PUBLICATIONS

Bhukhanwala et al., "Automated Global Enhancement of Digital Photographs", IEEE Transaction on Consumer Electronics, Feb. 1994, pp. 1-10, vol. 40., No. 1.

(Continued)

*Primary Examiner*—Sath V Perungavoor
(74) *Attorney, Agent, or Firm*—Lisa K. Jorgenson; Robert Iannucci; Seed IP Law Group PLLC

(57) ABSTRACT

A digital image processing method includes extracting chromatic information of an image taken by an image taking device and related to a human subject; detecting visually interesting regions; and exposure correcting of the taken image by normalizing a grey scale of the taken image based on the visually interesting regions. Advantageously, the method includes recognizing areas corresponding to the skin of the subject, these areas being used as the visually interesting regions for the exposure correction step.

7 Claims, 10 Drawing Sheets

U.S. PATENT DOCUMENTS

| | | | | |
|---|---|---|---|---|
| 5,990,949 | A * | 11/1999 | Haruki | 348/254 |
| 6,249,317 | B1 * | 6/2001 | Hashimoto et al. | 348/364 |
| 6,292,574 | B1 * | 9/2001 | Schildkraut et al. | 382/117 |
| 6,845,181 | B2 * | 1/2005 | Dupin et al. | 382/274 |
| 6,975,759 | B2 * | 12/2005 | Lin | 382/167 |
| 7,057,653 | B1 * | 6/2006 | Kubo | 348/273 |
| 7,227,991 | B2 * | 6/2007 | Castorina et al. | 382/167 |
| 7,376,270 | B2 * | 5/2008 | Chen et al. | 382/167 |
| 7,430,333 | B2 * | 9/2008 | Yu et al. | 382/254 |
| 7,539,342 | B2 * | 5/2009 | Tabata et al. | 382/167 |
| 7,542,600 | B2 * | 6/2009 | Yu et al. | 382/167 |
| 7,609,908 | B2 * | 10/2009 | Luo et al. | 382/274 |
| 7,616,233 | B2 * | 11/2009 | Steinberg et al. | 348/222.1 |
| 2002/0063899 | A1 | 5/2002 | Acharya et al. | 358/302 |
| 2003/0035578 | A1 * | 2/2003 | Dupin et al. | 382/167 |
| 2003/0052978 | A1 * | 3/2003 | Kehtarnavaz et al. | 348/223.1 |
| 2003/0108245 | A1 * | 6/2003 | Gallagher et al. | 382/228 |
| 2004/0218832 | A1 * | 11/2004 | Luo et al. | 382/274 |
| 2006/0088210 | A1 * | 4/2006 | Yu et al. | 382/167 |
| 2008/0158396 | A1 * | 7/2008 | Fainstain et al. | 348/246 |
| 2008/0212892 | A1 * | 9/2008 | Doida et al. | 382/274 |

FOREIGN PATENT DOCUMENTS

| | | |
|---|---|---|
| EP | 1 128 660 A2 | 8/2001 |
| EP | 1326209 A1 | 7/2003 |
| JP | 4150692 A | 5/1992 |

OTHER PUBLICATIONS

Mann, "Comparametric Equations with Practical Applications in Quantigraphic Image Processing", IEEE Transactions on Image Processing, Aug. 2000, pp. 1389-1406, vol. 9, No. 8.

Rein-Lien et al., "Face Detection in Color Images", IEEE Transactions on Pattern Analysis and Machine Intelligence, May 2002, pp. 696-706, vol. 24, No. 5.

Sakue et al., "Adaptive Gamma Processing of the Video Cameras For the Expansion of the Dynamic Range", IEEE Transactions on Consumer Electronics, Aug. 1995, pp. 555-562, vol. 41, No. 3.

Soriano et al., "Skin Color Modeling Under Varying Illumination Conditions Using the Skin Locus for Selecting Training Pixels", Real-time Image Sequence Analysis, Aug. 31-Sep. 1, 2000, Finland.

Soriano et al., "Skin Detection in Video Under Changing Illumination Conditions", Proc. of the 15th International Conferences on Pattern Recognition, Sep. 3-7, 2000, pp. 839-842, vol. 1.

Terrillon et al., "Comparative Performance of Different Skin Chrominance Models and Chrominance Spaces for the Automatic Detection of Human Faces in Color Images", Proc. of the Fourth IEEE International Conference on Automatic Face and Gesture Recognition, Mar. 28-30, 2000, pp. 54-61.

Zarit et al., "Comparison of Five Color Models in Skin Pixel Classification", Proc. of International Workshop on Recognition, Analysis and Tracking of Faces and Getures in Real-Time Systems, IEEE Computer Society, 1999, pp. 58-63, Corfu, Greece.

Yang et al., "Skin-Color Modeling and Adaptation," Technical Report CMU-CS97-146, School of Computer Science, Carnegie Mellon University, 1997, 26 pages.

Kim et al., "Facial Region Detection Using Range Color Information," IEICE Trans. Inf. & Syst., vol. E81-D, No. 9, pp. 968-975, Sep. 1, 1998.

* cited by examiner

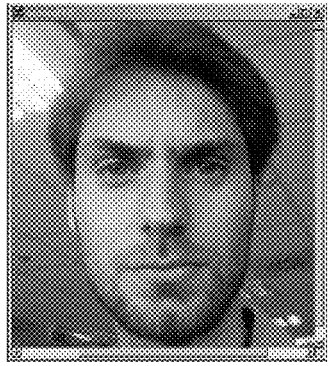
FIG. 5A        FIG. 5B        FIG. 5C
FIG. 6A        FIG. 6B        FIG. 6C

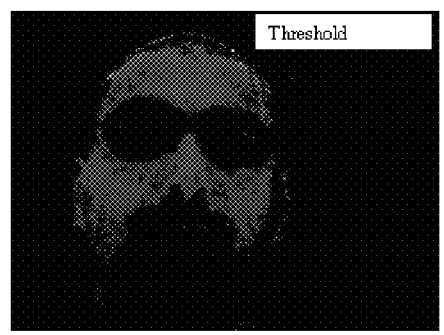 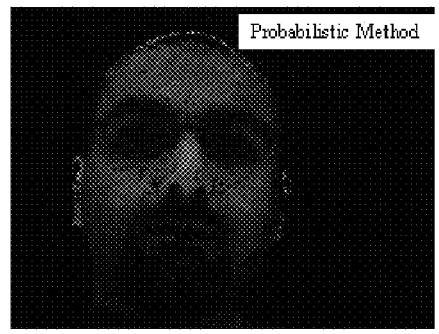
FIG. 7C    FIG. 7B
FIG. 7D

DIGITAL IMAGE PROCESSING METHOD HAVING AN EXPOSURE CORRECTION BASED ON RECOGNITION OF AREAS CORRESPONDING TO THE SKIN OF THE PHOTOGRAPHED SUBJECT

BACKGROUND OF THE INVENTION

1. Field of the Invention

The present invention relates to a digital image processing method. The invention relates particularly, but not exclusively, to an image processing method of human subjects being photographed by portable image taking devices, particularly of backlit subjects and the following description is made with reference to this field of application for convenience of illustration only.

2. Description of the Related Art

As is well known, one of the main problems limiting photographic image quality involves the generation of sub-optimal photographs due to the wrong exposure to light of the photographed subject.

This problem is particularly suffered in portable devices such as mobile phones, wherein several factors concur in obtaining photographs that are wrongly exposed: the smallness of the available optical device, the lack of a flash device and the like. Moreover, the portable device nature and the traditional use of the photographs produced therefrom, particularly linked to the so-called multimedia messaging services or MMS, cause the acquisition of photographs of the type shown in FIG. 3.

Although it is impossible to provide a precise definition of a correct exposure, since the exposure depends on the photographed subject as well as on the personal taste of the person looking at the photograph, it is however possible to state that, for "normal" subjects (and thus not considering extreme cases, like a snow-covered landscape whose correct acquisition would involve an intentional photograph overexposure), a correct exposure is obtained when the main features of the photographic image are reproduced by using an intermediate grey level.

In the image processing field several techniques for improving the tone quality of photographic images are well known, such as histogram equalization, grey-level slicing, and histogram stretching.

Although advantageous under many aspects, these prior art techniques have several drawbacks mainly linked to the fact of being independent from the visual content of the photographed images.

The article entitled "Automated Global Enhancement of Digitized Photographs" by Bhukhanwale et al., published on the IEEE Transaction on Consumer Electronics, vol. 40, no. 1, 1994, which is hereby incorporated by reference in its entirety, describes instead an algorithm being capable to identify visually important regions in a photographic image, by adjusting the image exposure so that these regions occupy intermediate tone levels.

Moreover, the European patent application no. EP 01830803.1 and assigned U.S. application Ser. No. 10/323,589 filed in the name of STMicroelectronics, the assignee of the present application, which is hereby incorporated by reference in its entirety, describes an algorithm being similarly capable to identify visually important regions in a photographic image in order to replace them at intermediate tone levels. This algorithm directly processes images of the Bayer Pattern type and simplifies the statistical measures used to detect regions in the image having a high information content, i.e., visually important regions.

The algorithms provided in this document directly operate on the image in the Bayer Pattern format and they comprise the following steps:

extraction of the Bayer Pattern green plane or channel G: this plane provides a good approximation of the luminance Y.

visual analysis: once the channel G has been extracted, the visually interesting regions are identified on this channel. For this purpose, the green plane is split into N blocks having the same size and the following statistical values are calculated for each block:

focus: it characterizes the block sharpness and it is used for identifying the regions comprising high-frequency components, corresponding to details of the photographed image;

contrast: it is related to the image tone range—the higher the contrast, the higher the insulation of the so-called clusters of points in the block, i.e., the higher the block visual impact.

In order to obtain important visual features, independently from the lighting conditions of the photographed image, the visual analysis is performed on an image having an intermediate luminosity produced by making a temporary correction only based on the average value of the channel G calculated on the whole plane. The algorithms further perform exposure adjustment: once the visually interesting regions have been detected, the exposure adjustment is performed by using the average grey levels of these regions as reference values. In greater detail, the photographed image is changed so to bring the average value of these regions to a target value T by changing all the pixels belonging to the Bayer Pattern. This target value T should be a value ranging around 128 and it should take into consideration a possible correction range performed after the color reconstruction of the corrected Bayer Pattern. This means that, in certain cases, the target value T could be substantially lower than 128.

To this aim, a simulated response curve of a digital image taking device or camera is used, schematically shown in FIG. 1.

This curve gives an evaluation of how the light values picked up by the camera are turned into pixel values, i.e., it represents the function:

$$f(q) = I \tag{1}$$

q being the light amount and I the final pixel value.

This simulated response function (1) of a camera can be expressed in a parametric way:

$$f(q) = \frac{255}{(1 + e^{-(Aq)})^C} \tag{2}$$

A and C being the control parameters of the curve shape and the value q being expressed in base 2 logarithmic units (also known with the name "stops". It is possible to evaluate these control parameters A and C by using the information comprised in the article by Mann et al. entitled "Comparametric Equations with Practical Applications in Quantigraphic Image Processing", IEEE Transactions on Image Processing, Vol. 9, no. 8, 2000, which is hereby incorporated by reference in its entirety.

It is also possible to obtain experimentally the values of these parameters A and C or to set them in order to realize a particular final effect (for example, a more or less marked improvement of the contrast). In particular, FIG. 1 shows the trend of the simulated response curve expressed by the formula (2) with A=7 and C=0.13.

By using this simulated response curve f and an average grey level avg for the visually important regions, the distance Δ of an ideal exposure situation is expressed as:

$$\Delta = f^{-1}(128) - f^{-1}(avg) \quad (3)$$

and the grey value I(x, y) of a pixel with position (x, y) is thus changed in:

$$I'(x,y) = f(f^{-1}(I(x,y)) + \Delta) \quad (4)$$

It is worth noting that all the grey values of the pixels are corrected.

In particular, the above-mentioned changes are substantially a look-up table (LUT) transformation (i.e., they can be put in a table in order to be then referred to) and FIGS. 2A and 2B show two different transformations (the curves LUT1 and LUT2) generated from a first simulated response curve f1 with values A=7 and C=0.13 and a second simulated response curve f2 with values A=0.85 and C=1.

It is worth noting that the distance or offset of the value 128 is 1.24 for f1 and 0.62 for f2 respectively (starting from a same input value equal to 72).

From the FIGS. 2A and 2B it is evident that the first curve LUT1 has a more linear trend, while the second curve LUT2 has a so-called range trend.

Although advantageous under several aspects, these prior art techniques are not very effective in the case of portable devices like mobile phones for which the photographic images are often backlit and they are mainly focused on human figures, when the user uses the image transmission for videophony, as shown in FIG. 3.

BRIEF SUMMARY OF THE INVENTION

One embodiment of the present invention provides an image processing method having such features as to overcome the limits still affecting prior art techniques.

One embodiment of the present invention detects the features in the photograph of the skin of the subject being photographed in order to select and find convenient interesting regions on whose base an exposure adjustment/correction is applied.

One embodiment of the present invention is directed to a digital image processing method that includes: extracting chromatic information of an image taken by an image taking device and related to a human subject; detecting visually interesting regions in the taken image by recognizing areas corresponding to skin of the subject, wherein the recognized areas are the visually interesting regions; and correcting exposure of the taken image by normalizing a grey scale of the taken image based on the visually interesting regions.

The features and advantages of the method according to the invention will be apparent from the following description of an embodiment thereof given by way of non-limiting example with reference to the attached drawings.

BRIEF DESCRIPTION OF THE DRAWINGS

In the drawings:

FIGS. 5A-5C and 6A-6C show following image processings for detecting important areas which are used in a step of the image processing method according to one embodiment of the invention;

FIGS. 7A-7D schematically shows the method according to one embodiment of the invention by means of following image processings;

DETAILED DESCRIPTION OF THE INVENTION

Figure 3:
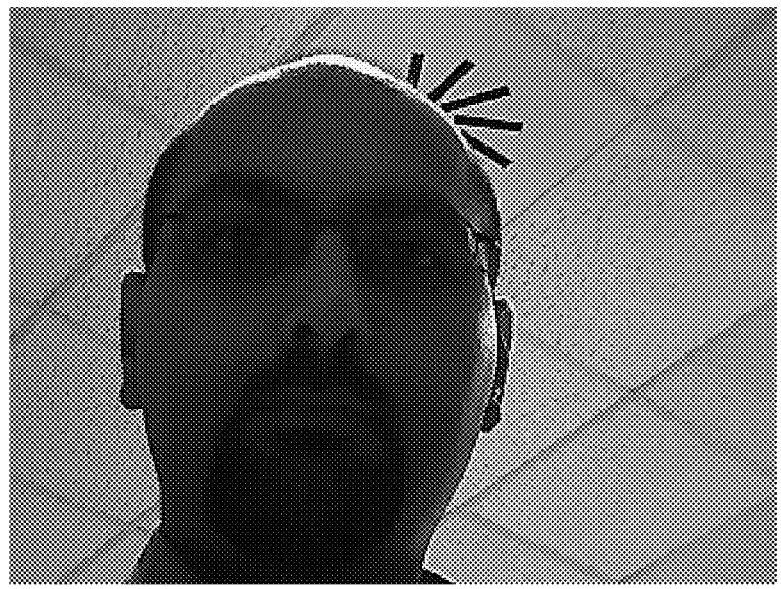
FIG. 3 shows an image of a backlit subject taken by a known image taking device.

An image processing method according to one embodiment of the invention performs an exposure correction of a digital photographed image taken by an image taking device on the basis of a recognition algorithm of the skin of the photographed subject, thus improving the final photographic image quality, in a decisive way in the case of backlit subjects as in FIG. 3.

In particular, the method comprises the following steps:

1) a first extraction step of chromatic information from the photographic image;

2) a second visual analysis step using a recognition method of the areas corresponding to the skin of the subject photographed in the photographic image; and 3) a third exposure adjustment step of the obtained photographic image.

1) Extraction Step

As has been seen with reference to known image processing methods, the method provides the extraction of the green channel G of the image taken when the images are in the Bayer format.

On the contrary, it provides the extraction of the luminance channel Y for images of the YcbCr type obtained from RGB images.

2) Visual Analysis Step

This analysis can be performed on:

1. images in the RGB format;

2. images in the Bayer Pattern format generating, from an initial image, a conveniently sub-sampled RGB copy.

In particular, by using this skin recognition method, a plurality of visually interesting regions corresponding to the skin of the photographed subject are detected.

The chromatic information obtained during the first extraction step is thus used.

Figure 4:
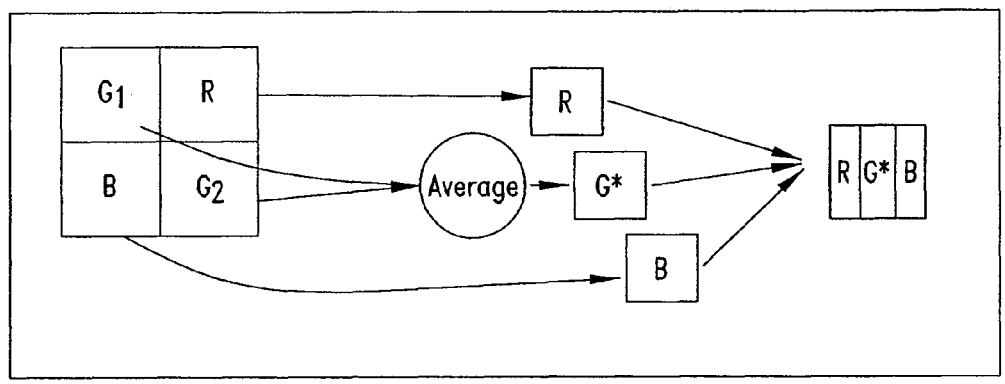
FIG. 4 shows an illustrative diagram of a step of the image processing method according to one embodiment of the invention.

In particular, using Bayer data, it is possible to operate on three color planes and on sub-samples having a size corresponding to a quarter of the initial data, as schematically shown in FIG. 4, thus considerably reducing the calculation efforts of the method.

3) Third Exposure Adjustment Step

This adjustment can be performed in two ways:

1. correction of images in the RGB format;

2. correction of images in the Bayer Pattern format before a following color interpolation algorithm.

In the case of the correction of images in the RGB format, once the visually important pixels have been detected as above-mentioned (i.e., the pixels belonging to the area corresponding to the skin of the photographed subject), a known exposure correction algorithm is used, wherein the average grey level of the known pixel clusters is considered as belonging to the skin of the photographed subject.

In other words, the pixels belonging to the subject skin are placed at the intermediate level of the image grey scale and all the remaining image pixels are placed once again based on this average level.

Figure 1:
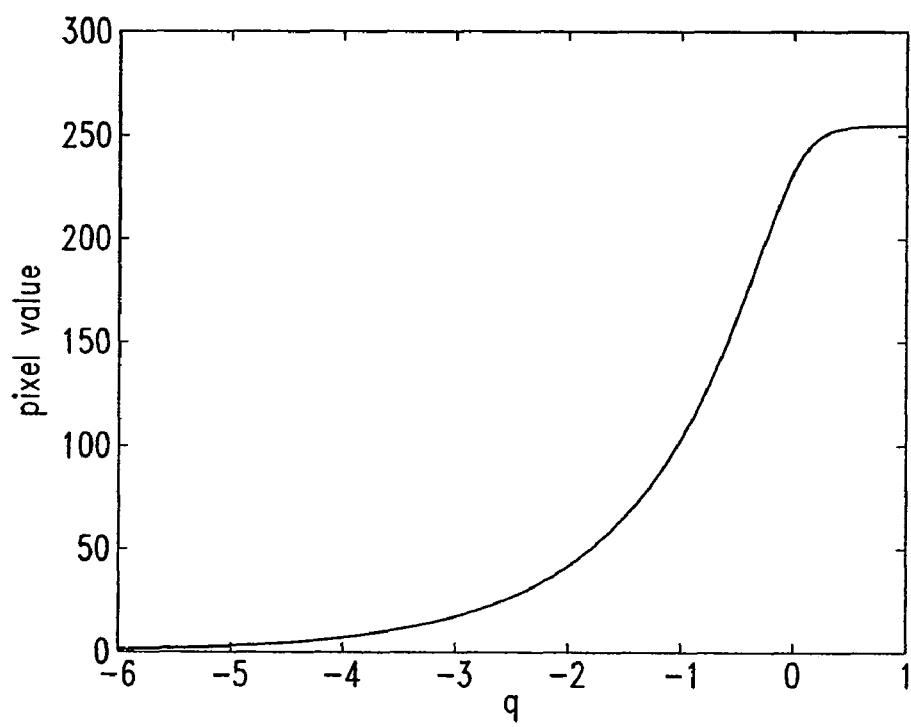
FIG. 1 shows the trend of a simulated response curve of a known image taking device.
Figure 2A:
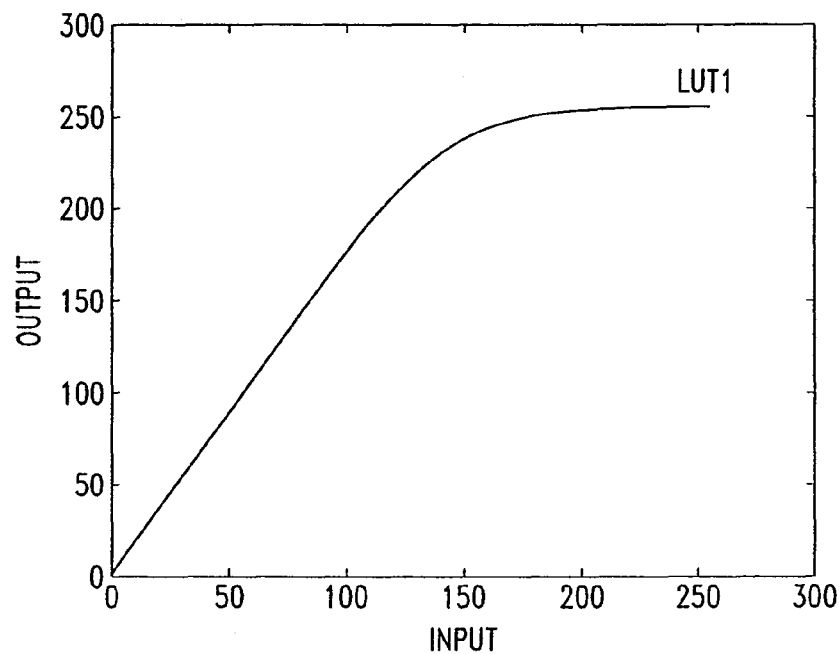
FIGS. 2A and 2B show LUT transformations related to different curves like the one in FIG. 1.
Figure 2B:
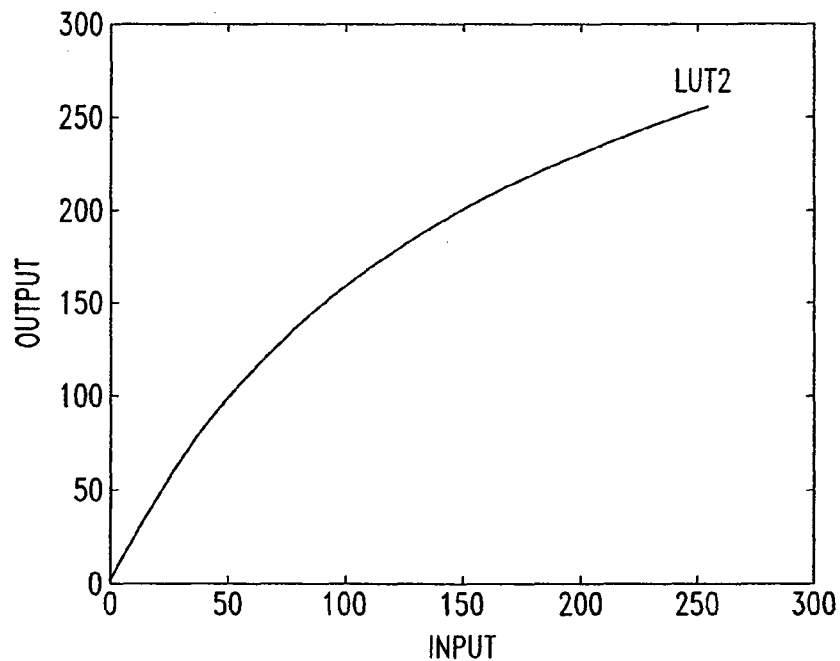

In particular, once the luminance value has been corrected from an original value Y to a revised value Y' that reflects the average grey level of the know pixel clusters corresponding to the skin of the subject, according to the above-mentioned steps (2), (3) and thus using the information comprised in the article by Sakaue et al. entitled "Adaptive Gamma Processing of the Video Cameras for the Expansion of the Dynamic Range", IEEE Transaction on Consumer Electronics, Vol. 41, n. 3, August 1995, which is hereby incorporated by reference in its entirety, starting from a curve of the type shown in FIG. 1, the pixel chromatic values can be reconstructed according to the formulas:

$$R' = 0.5 \cdot \left( \frac{Y'}{Y} \cdot (R+Y) + R - Y \right) \quad (5)$$

$$G' = 0.5 \cdot \left( \frac{Y'}{Y} \cdot (G+Y) + G - Y \right) \quad (6)$$

$$B' = 0.5 \cdot \left( \frac{Y'}{Y} \cdot (B+Y) + B - Y \right) \quad (7)$$

R, G, B being the color values of the input pixels.

In the case of the correction of images in the Bayer format the formulas (5), (6) and (7) cannot be used and the output product will be obtained by simply applying the relation (4) to all the pixels of the pattern.

The recognition method of the areas corresponding to the skin of the subject photographed in the photographic image will be now described in greater detail.

Several recognition methods of the color of the skin of the photographed subject are known, substantially based on the application of a threshold to a color probability measure for the skin.

In fact, the colors of the human skin belong to a particular color category, different from the colors of most natural objects. In particular, in the article by Zarti et al. entitled "Comparison of Five Color Models in Skin Pixel Classification", Proc. Of Int. Workshop on Recognition, Analysis and Tracking of Faces and Gestures in Real-Time Systems, IEEE Computer Society, Corfu, Greece, pages 58-63, 1999, which is hereby incorporated by reference in its entirety, it has been shown that the colors of the human skin are clustered and that the skin changes between each subject are substantially due to a different intensity and they can thus be reduced by using only the chrominance component of the subject image.

Moreover, in the article by Yang et al. entitled "Skin-Color Modeling and Adaptation", Technical Report CMU-CS-97-146, School of Computer Science, Carnegie Mellon University, 1997, which is hereby incorporated by reference in its entirety, it has been shown that the human skin color slicing can be represented by a bidimensional Gaussian function in the chrominance plane. The center of this slicing is determined by the mean vector $\vec{\mu}$ and the amplitude of the bell thereof is determined by the covariance matrix $\Sigma$, these two values being evaluated starting from a convenient group of test data.

The conditional probability $p(\vec{\chi}|s)$ of a pixel block to belong to a human skin color class starting from the chrominance vector thereof $\vec{\chi}$ is thus given by:

$$p(\vec{x}|s) = \frac{1}{2\pi} |\Sigma|^{\frac{1}{2}} \exp\left\{ \frac{-[d(\vec{x})]^2}{2} \right\} \quad (8)$$

$d(\vec{\chi})$ being the so-called Mahalonobis distance of the chrominance vector $\vec{\chi}$ of the mean vector $\vec{\mu}$, defined as:

$$[d(\vec{\chi})]^2 = (\vec{\chi} - \vec{\mu})' \Sigma^{-1} (\vec{\chi} - \vec{\mu}) \quad (9)$$

In other words, the value of the Mahalonobis distance $d(\vec{\chi})$ of a pixel block with chrominance vector $\vec{\chi}$ determines the probability of this block to belong to a predetermined human skin color class. The higher the Mahalonobis distance $d(\vec{\chi})$ is, the lower the probability of the block belonging to this human skin color class.

Given the considerable amount of color types, of distance measures and of bidimensional slicings, a considerable variety of image processing algorithms can be considered. Moreover, the lighting conditions and the color models can change according to the image taking modes.

Advantageously, the method comprises a step of recognizing a portion of the photographic image corresponding to the subject skin.

In a first embodiment, this recognition step is substantially based on a probabilistic function.

In particular, for each pixel of an image taken in the YcrCb format a probabilistic slicing is prepared to evaluate if this pixel must be classified as belonging to the subject skin. Based on this slicing, a new image is thus processed with a normalized grey scale, wherein the subject skin is highlighted as indicated in FIGS. 5A-6C on two different photographic images which depict human subjects.

Based on this first embodiment of the recognition step of the photographed subject skin, the image pixels with higher grey values are considered as belonging to the skin of the photographed subject.

The areas being detected by using this first embodiment of the recognition step of the skin of the photographed subject on an image shown in FIG. 5A are shown in FIGS. 5B and 5C. Similarly, FIG. 6C highlights areas of the image of FIG. 6A corresponding to the skin of another photographed subject, according to the first embodiment of the recognition step.

In a second embodiment, the recognition step of the image areas corresponding to the skin of the photographed subject is substantially based on a single threshold area and it provides an RGB-format image processing in order to produce a chrominance slicing histogram starting from normalized channels r and g as described in the article by Soriano et al. entitled "Skin Color Modeling Under Varying Illumination Conditions Using the Skin Locus for Selecting Training Pixels", Real-time Image Sequence Analysis (RISA2000, August 31-September 1, Finland), which is hereby incorporated by reference in its entirety. In particular, the normalized channels r and g are defined as:

$$r = R/(R+G+B) \quad (10)$$

$$g = G/(R+G+B) \quad (11)$$

The resulting bidimensional histogram shows the chrominance slicing in the image and the areas having the right human skin chrominance slicing are thus detected by applying a single threshold area. In particular, the pixels of the processed image belonging to the threshold area are classified as belonging to the subject skin.

Similarly, FIG. 5B shows the areas, detected by using this second embodiment of the recognition step, corresponding to the skin of the photographed subject from an image shown in FIG. 5A of a human subject. Also, FIG. 6B highlights areas of the image of FIG. 6A corresponding to the skin of another photographed subject, according to the second embodiment of the recognition step.

FIG. 7A-D schematically show the following processings of an image concerning a human subject, particularly backlit, after the different steps of the method according to alternate embodiments of the invention.

In particular, on a taken image (FIG. 7A) the recognition step of the areas corresponding to the photographed subject skin is performed with a probabilistic (FIG. 7B) or threshold (FIG. 7C) method.

An exposure correction step can thus be performed by using the areas detected as belonging to the skin of the photographed subject in order to normalize the grey levels obtaining a final processed image (FIG. 7D), the best image quality being immediately evident by comparing it with the starting image (FIG. 7A).

Advantageously, the regions being detected in the recognition step as belonging to the subject's skin are used as visually important images for the following exposure adjustment step of the photographic image.

In a preferred embodiment of the image processing method according to the invention, the recognition step of the areas belonging to the photographed subject's skin processes a 8-bit image of the Bayer type, constructing a color image of sub-samples with size corresponding to a quarter of the initial data, obtained as previously described and schematically shown in FIG. 4.

Starting from this color image of sub-samples, a recognition step of the areas belonging to the photographed subject's skin is performed using a chrominance slicing histogram according to the first probabilistic embodiment or the normalized channels r and g according to the second threshold embodiment.

However, in this second case, the normalized channels r and g are defined as:

$$r=R/(R+G^*+B) \quad (12)$$

$$g=G^*/(R+G^*+B) \quad (13)$$

being $$G^*=(G1+G2)/2 \quad (14)$$

Figure 8A:
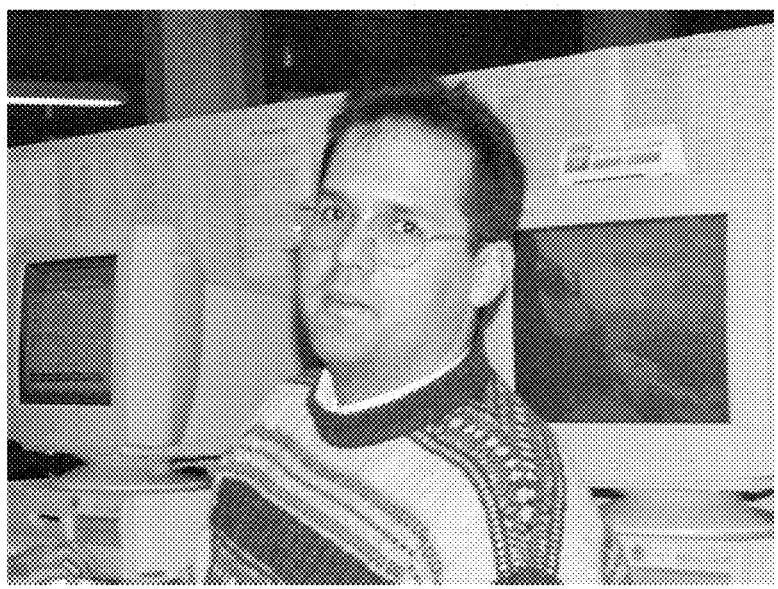
FIG. 8A shows an image of a subject.
Figure 8B:
FIG. 8B shows an image of the subject of FIG. 8A with areas highlighted corresponding to the skin of the subject.
Figure 8C:
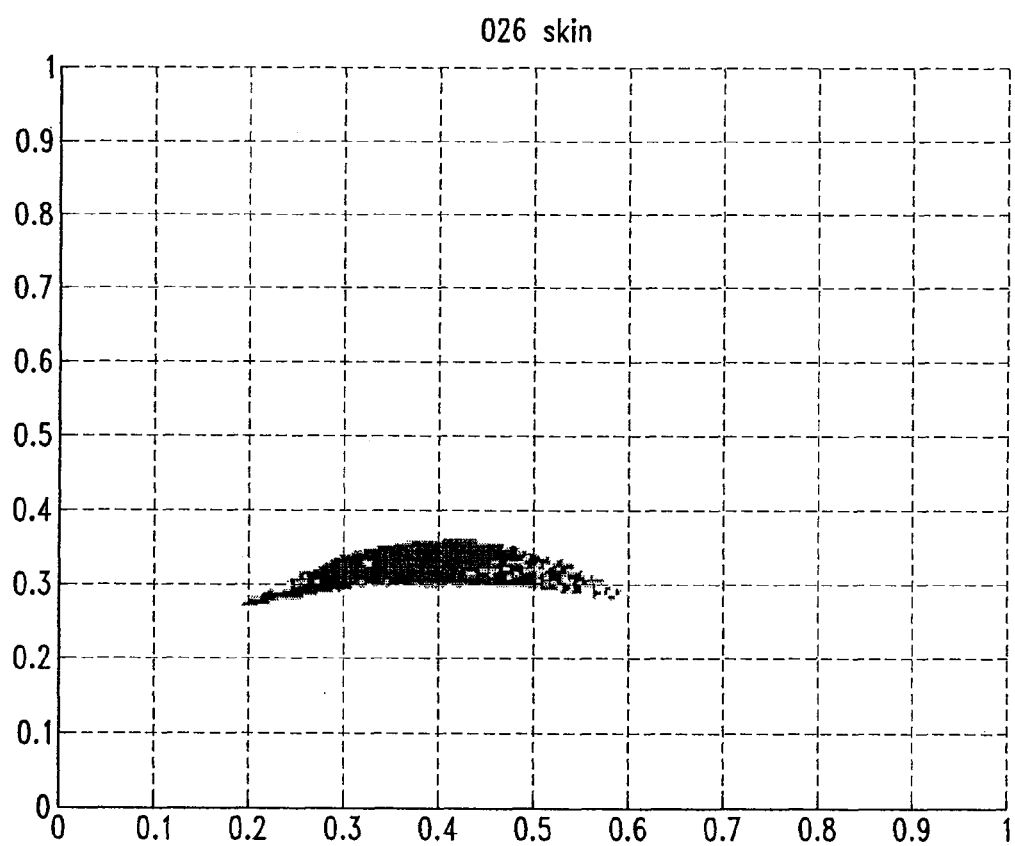
FIG. 8C shows a detection histogram of the image of FIG. 8A.

The resulting bidimensional histogram shows the chrominance slicing of the processed image, therefore the areas corresponding to the photographed subject skin, as schematically shown in FIGS. 8A-C, showing in series a taken image of the Bayer type (FIG. 8A), the image (FIG. 8B) processed to detect the areas corresponding to the photographed subject skin and a detection histogram (FIG. 8C) r-g of these areas.

The method finally comprises a reconstruction step of the color of the image taken according to the relations (5) to (7), already shown with reference to the prior art, R, G, B and R', G', B' being the red, green and blue values of the images being respectively taken and processed.

The step sequence being described is suitable for a simple change allowing a correction to be performed directly on images in the Bayer Pattern format in favor of a further simplification from the calculation point of view. In fact, once the image for the skin detection according to the diagram of FIG. 4 has been constructed, the average value calculated for the regions concerned can be used to directly perform the Bayer Pattern correction, using for example the modes described in the above-mentioned European patent application no. 01830803.1.

It is however worth noting that the color reconstruction formulas described in the equations (5), (6), (7) cannot be used in this case and the output product of the corrected Bayer Pattern will be obtained by simply applying the relation (4) to all the model pixels.

Figure 9A:
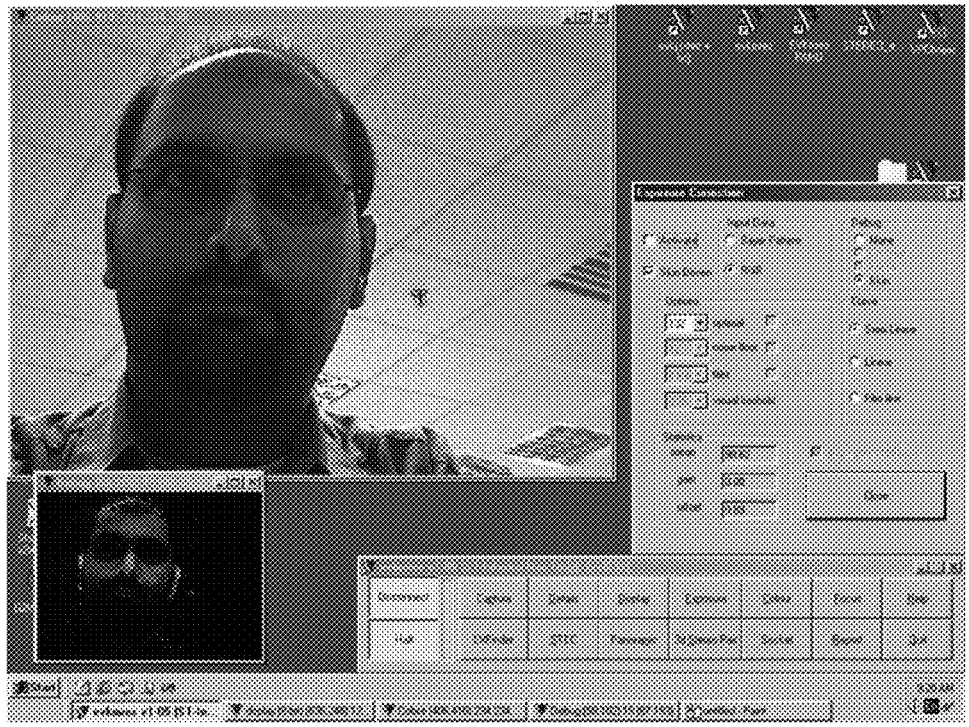
FIGS. 9A-12B show processed images obtained by the method according to alternate embodiments of the invention.
Figure 9B:
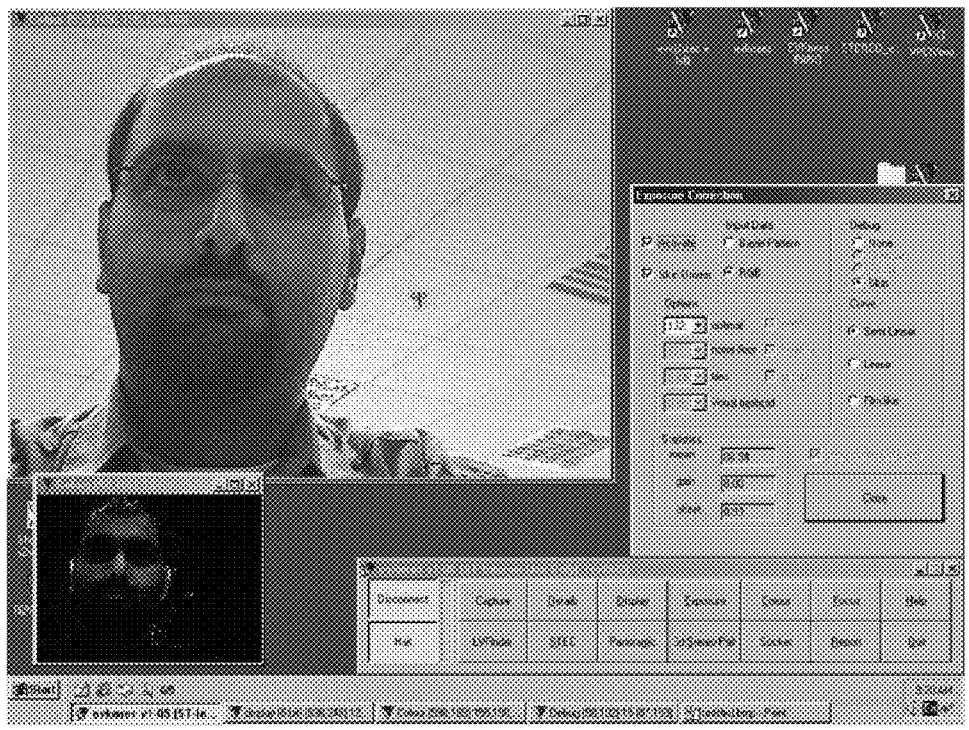
Figure 10A:
Figure 10B:
Figure 11A:
Figure 11B:
Figure 12A:
Figure 12B:

In other words, the grey value I(x, y) of a pixel with position (x, y) is modified in:

$$I'(x,y)=f(f^{-1}(I(x,y))+\Delta), \quad (15)$$

where $\Delta$ is the distance of the ideal exposure situation as expressed in relation (3). The image processing of a backlit subject being performed by using a CMOS-VGA sensor and an evaluation kit on the Windows® platform is shown in FIGS. 9A-9B, wherein in the panel V the areas detected as belonging to the photographed subject's skin have been indicated on a black background.

Similarly, FIGS. 10A-12B show the results of a simulation of the method performed by the inventors starting from images taken by a common VGA sensor in the compressed jpeg format (FIGS. 10A, 11A) and by a 4.1 Mpixel CCD sensor of a traditional average-band DSC (Digital Still Camera) (12A) and the images processed with the method 10B, 11B, 12B respectively have been indicated, wherein the image qualitative improvement is completely evident.

All of the above U.S. patents, U.S. patent application publications, U.S. patent applications, foreign patents, foreign patent applications and non-patent publications referred to in this specification and/or listed in the Application Data Sheetare incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A computer implemented digital image processing method, comprising:
    extracting chromatic information of a Bayer type image taken by an image taking device and related to a human subject;
    sub-sampling the Bayer type image according to $G^*=(G1+G2)/2$, wherein G1 and G2 are first and second green channels of the Bayer type image to produce an RGB image;
    constructing a chrominance slicing histogram of the RGB image using normalized channels r and g of the type:

$$r=R/(R+G^*+B)$$

$$g=G^*/(R+G^*+B),$$

R, G and B being red, green and blue values of each pixel of the RGB image;
    detecting visually interesting regions in the RGB image by recognizing areas corresponding to skin of the subject using the chrominance slicing histogram, wherein the recognized areas are the visually interesting regions; and correcting an exposure of the Bayer type image or the RGB image by normalizing a grey scale of the Bayer type image or the RGB image based on said visually interesting regions.

2. A digital image processing method according to claim 1, wherein said exposure correction of said Bayer type image uses:

a simulated response function of a type:

$$f(q) = \frac{255}{(1+e^{-(Aq)})^C}$$

A and C being predetermined control parameters and q being a light quantity value expressed in base 2 logarithmic units; and a grey average level (avg) calculated on said visually interesting regions, in order to calculate a distance $\Delta$ of an ideal exposure situation using:

$\Delta = f^{-1}(128) - f^{-1}(\text{avg})$ and in order to change a luminance value Y(x, y) of a pixel with position (x, y) in:

$Y'(x, y) = f(f^{-1}(Y(x, y)) + \Delta)$.

3. A digital image processing method according to claim 1, further comprising a final color reconstruction step, wherein said final color reconstruction step provides that a grey value I(x, y) of a pixel with position (x, y) is changed in:

$I'(x, y) = f(f^{-1}(I(x, y)) + \Delta)$, where $\Delta$ is a distance of an ideal exposure situation.

4. A computer implemented digital image processing method, comprising:

extracting chromatic information from a Bayer type image of a human subject;

sub-sampling the Bayer type image according to G*=(G1+G2)/2, wherein G1 and G2 are first and second green channels of the Bayer type image to produce an RGB image;

constructing a chrominance slicing histogram of the RGB image using normalized channels r and g of the type:

$r = R/(R+G*+B)$ $g = G*/(R+G*+B)$,

R, G and B being red, green and blue values of each pixel of the RGB image;

detecting, based on the chrominance slicing histogram, which areas of the RGB image correspond to skin of the subject; and normalizing grey scale values of the Bayer type image or the RGB image based on the areas that are detected as corresponding to the skin of the subject.

5. The method of claim 4, wherein the normalizing step performs exposure correction of the Bayer type image that includes:

using a simulated response function of a type:

$$f(q) = \frac{255}{(1+e^{-(Aq)})^C}$$

A and C being predetermined control parameters and q being a light quantity value expressed in base 2 logarithmic units; and calculating a grey average level (avg) of the areas corresponding to the skin;

calculating a distance $\Delta$ of an ideal exposure situation using:

$\Delta f^{-1}(128) - f^{-1}(\text{avg})$; and changing a luminance value Y(x, y) of a pixel with position (x, y) in:

$Y'(x, y) = f(f^{-1}(Y(x, y)) + \Delta)$.

6. The method of claim 4, further comprising a final color reconstruction step that changes a grey value I(x, y) of a pixel with position (x, y) using:

$I'(x, y) = f(f^{-1}(I(x, y)) + \Delta)$, where $\Delta$ is a distance of an ideal exposure situation.

7. A digital image processor, comprising:

means for extracting chromatic information from a Bayer type image of a human subject;

means for sub-sampling the Bayer type image according to G*=(G1+G2)/2, wherein G1 and G2 are first and second green channels of the Bayer type image to produce an RGB image;

means for constructing a chrominance slicing histogram of the RGB image using normalized channels r and g of the type:

$r = R/(+G*+B)$ $g = G*/(R+G*+B)$

R, G and B being red, green and blue values of each pixel of the RGB images;

means for detecting, based on the chrominance slicing histogram, which areas of the RGB image correspond to skin of the subject; and means for normalizing grey scale values of the Bayer type image or the RGB image based on the areas that are detected as corresponding to the skin of the subject.

* * * * *

UNITED STATES PATENT AND TRADEMARK OFFICE
CERTIFICATE OF CORRECTION

PATENT NO. : 7,778,483 B2
APPLICATION NO. : 11/949709
DATED : August 17, 2010
INVENTOR(S) : Giuseppe Messina et al.

It is certified that error appears in the above-identified patent and that said Letters Patent is hereby corrected as shown below:

Column 9, Line 25
"$Y'(x,y)f(f^{-1}(Y(x,y)) + \Delta)$" should read as
--$Y'(x,y) = f(f^{-1}(Y(x,y)) + \Delta)$--.

Column 10, Line 19
" $\Delta f^{-1}(128) - f^{-1}(avg)$; and" should read as
-- $\Delta = f^{-1}(128) - f^{-1}(avg)$; and--.

Column 10, Line 45
"of the RGB images;" should read as --of the RGB image;--.

Signed and Sealed this

Seventh Day of December, 2010

David J. Kappos
*Director of the United States Patent and Trademark Office*